Aug. 20, 1968 R. J. COOK 3,397,489
PRESSURE OR VACUUM VESSELS
Filed Feb. 7, 1966 7 Sheets-Sheet 2

INVENTOR
RONALD JOSEPH COOK
BY
Jacobs & Jacobs
ATTORNEY

Aug. 20, 1968  R. J. COOK  3,397,489

PRESSURE OR VACUUM VESSELS

Filed Feb. 7, 1966  7 Sheets-Sheet 3

INVENTOR
RONALD JOSEPH COOK.

BY
*Jacobs & Jacobs*
ATTORNEY

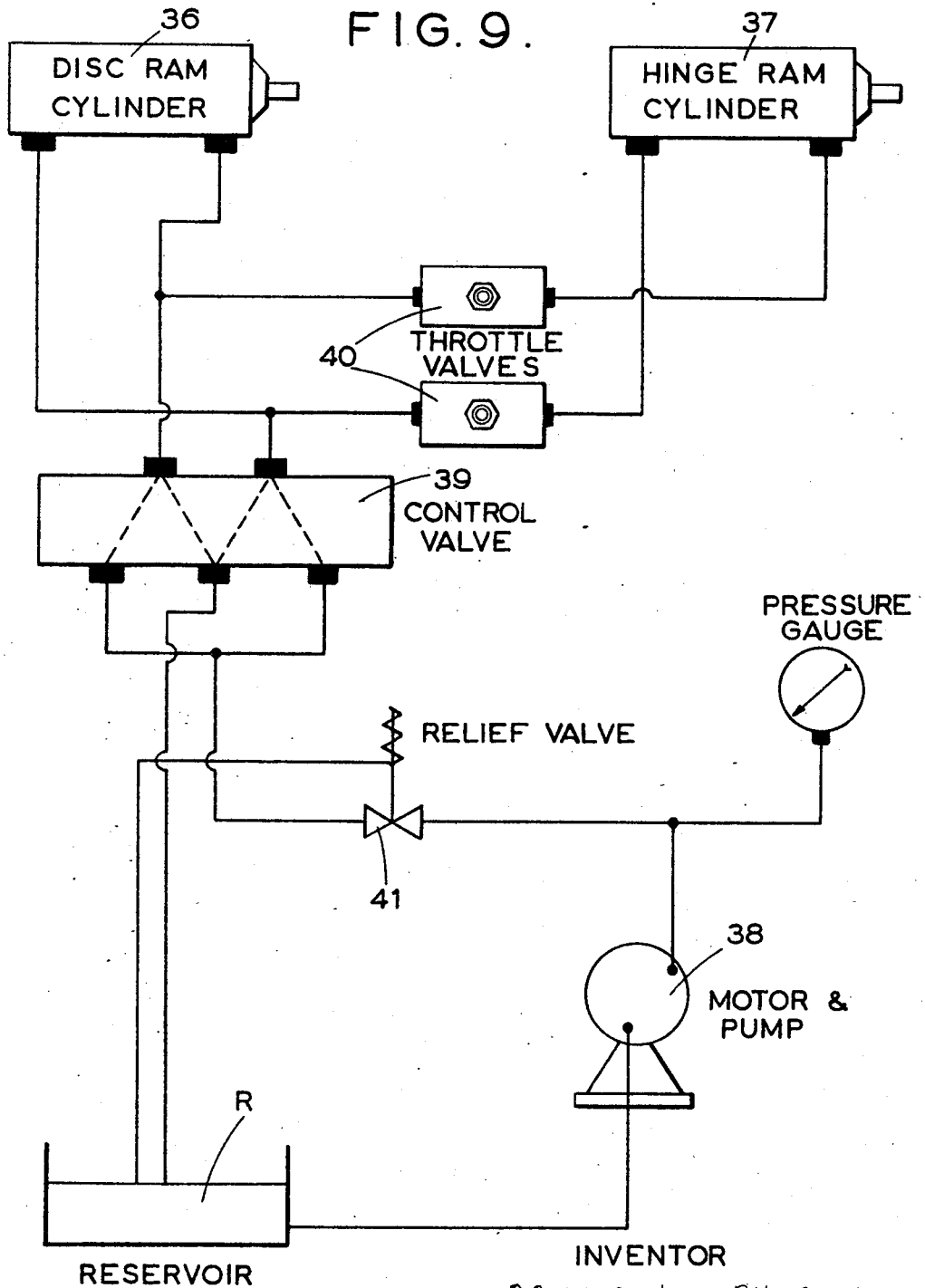

United States Patent Office 3,397,489
Patented Aug. 20, 1968

3,397,489
PRESSURE OR VACUUM VESSELS
Ronald Joseph Cook, London, England, assignor to Allen and Hanburys Limited, London, England, a British company
Continuation-in-part of application Ser. No. 366,835, May 12, 1964. This application Feb. 7, 1966, Ser. No. 525,541
Claims priority, application Great Britain, May 14, 1963, 19,110/63
6 Claims. (Cl. 49—281)

ABSTRACT OF THE DISCLOSURE

An improved door for pressure and vacuum vessels, comprises a plurality of arms which are connected at the inner end to a central disc, while the outer ends project beyond the door and engage with slots in the vessel. A piston and cylinder unit opens and closes the door, while another piston and cylinder unit rotates the disc to move the arms in and out of engagement with the slots. The two units are operated by a single source of power and have a single control. Manual operation is also possible.

---

This is a continuation-in-part of application Serial No. 366,835 now Patent No. 3,290,576.

This invention relates to pressure or vacuum vessels such as autoclaves, sterilizers or vacuum chambers.

It is an object of the invention to provide improved means whereby the open door of a pressure or vacuum vessel may be automatically closed and locked upon operation of a single control and whereby the locked door of the vessel may be automatically unlocked and opened upon operation of another single control.

The invention provides a pressure vessel which broadly comprises a hinged door, a plurality of locking arms slidable into and out of locking positions in which they will prevent the door being opened, first piston and cylinder means for opening or closing the door of the pressure vessel, second piston and cylinder means for sliding the locking arms to and from their locking positions, means for actuating the first piston and cylinder means to open the door when the locking arms have been moved from their locking positions by operation of the second piston and cylinder means to move the locking arms into the locking position when the door has been closed by the first piston and cylinder means.

An embodiment of the invention is illustrated in the accompanying drawing in which.

Figure 1:
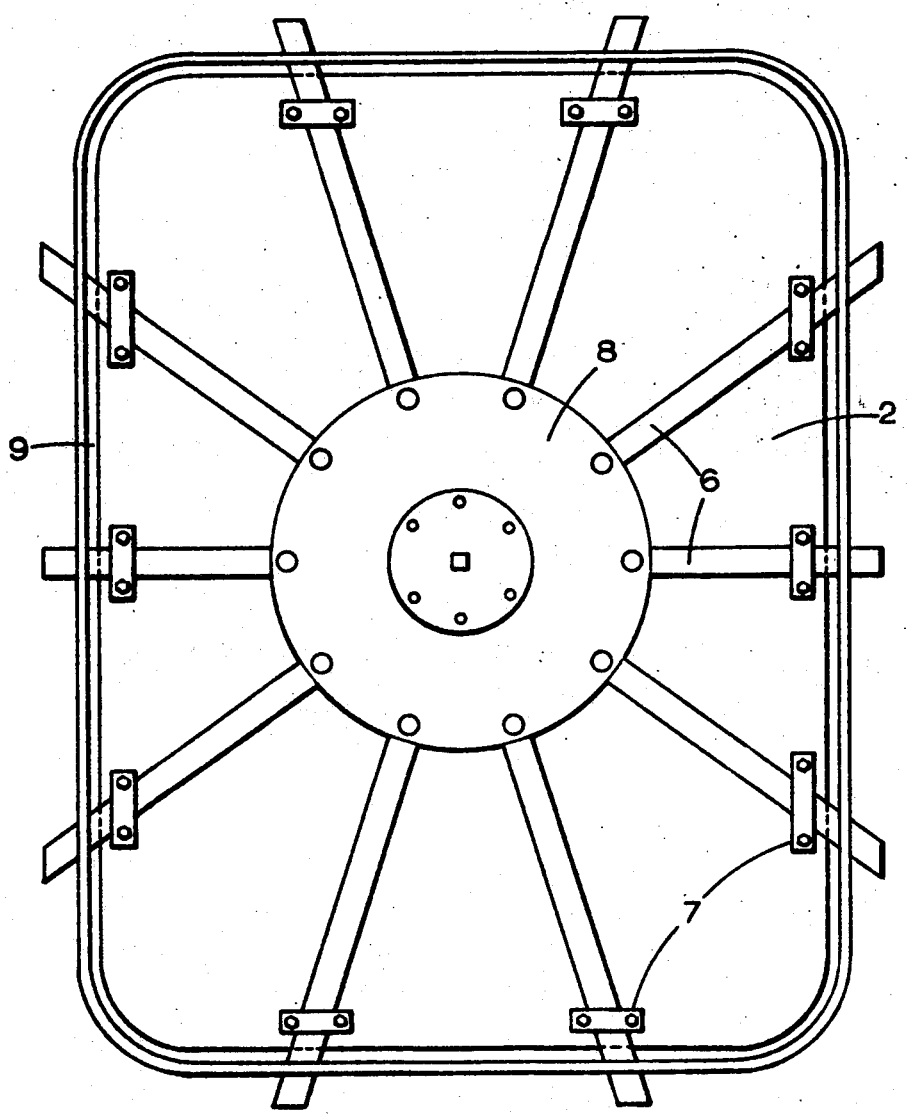
FIGURE 1 is a front elevation of a hospital sterilizer.
Figure 2:
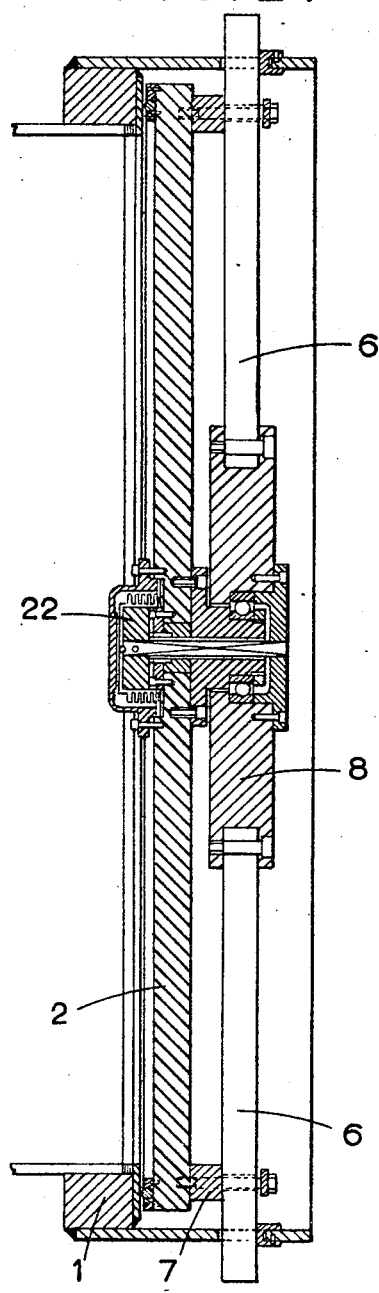
FIGURE 2 is a section through a door and adjacent part of the sterilizer.
Figure 8:
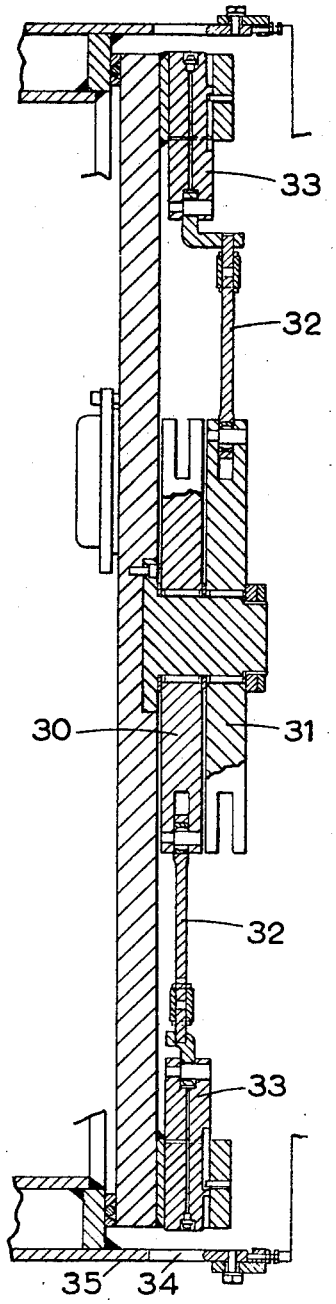
Figure 4:
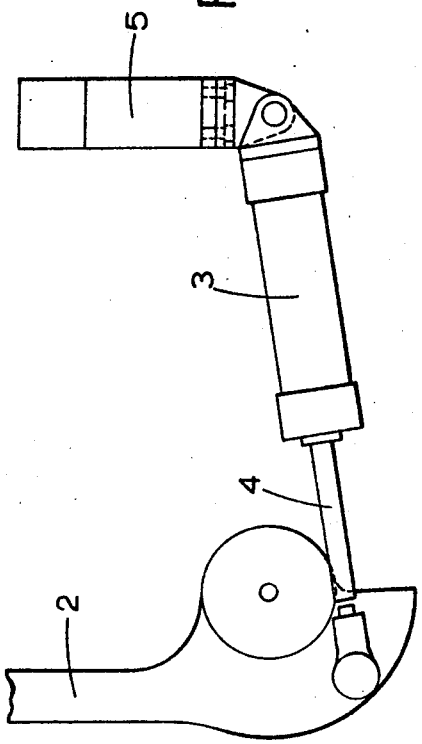
Figure 5:
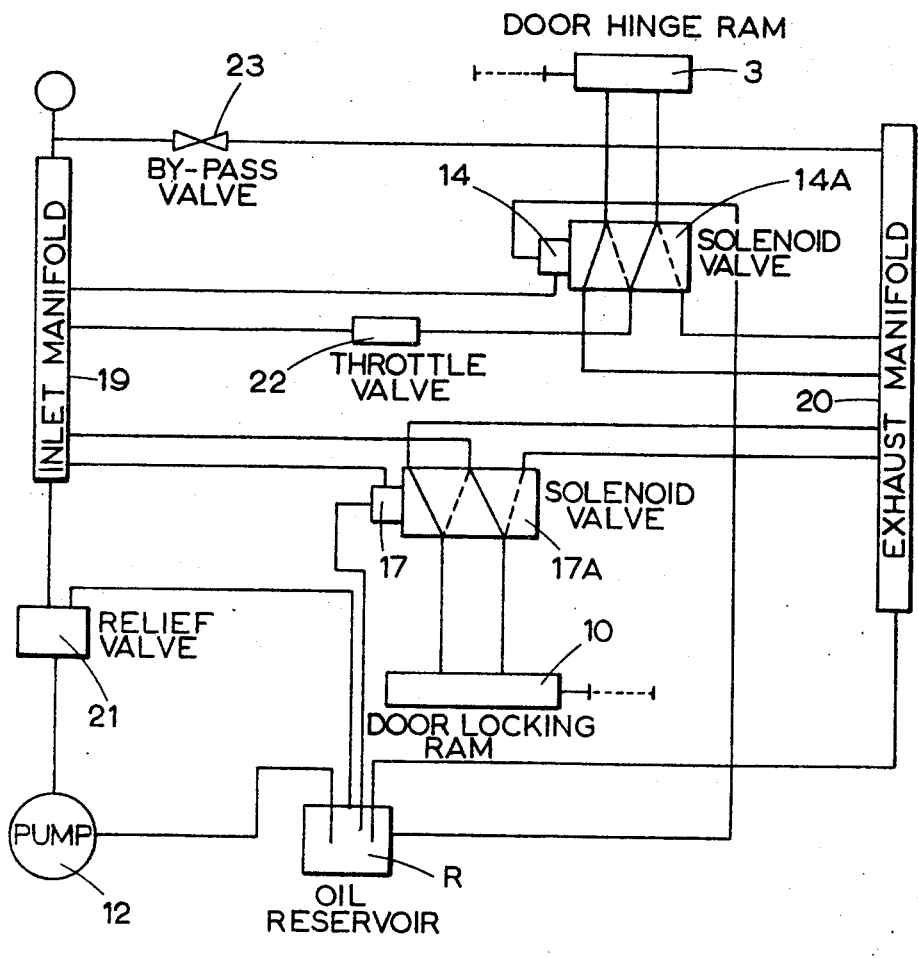
Figure 6:
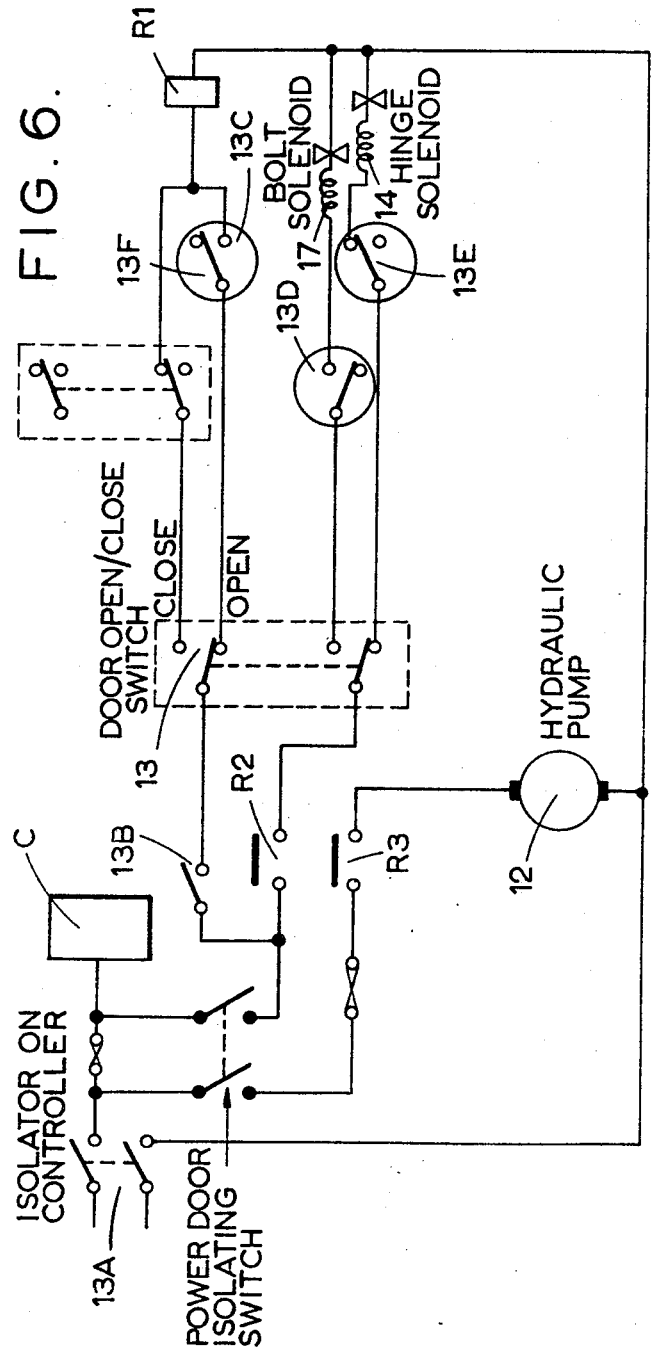
Figure 7:
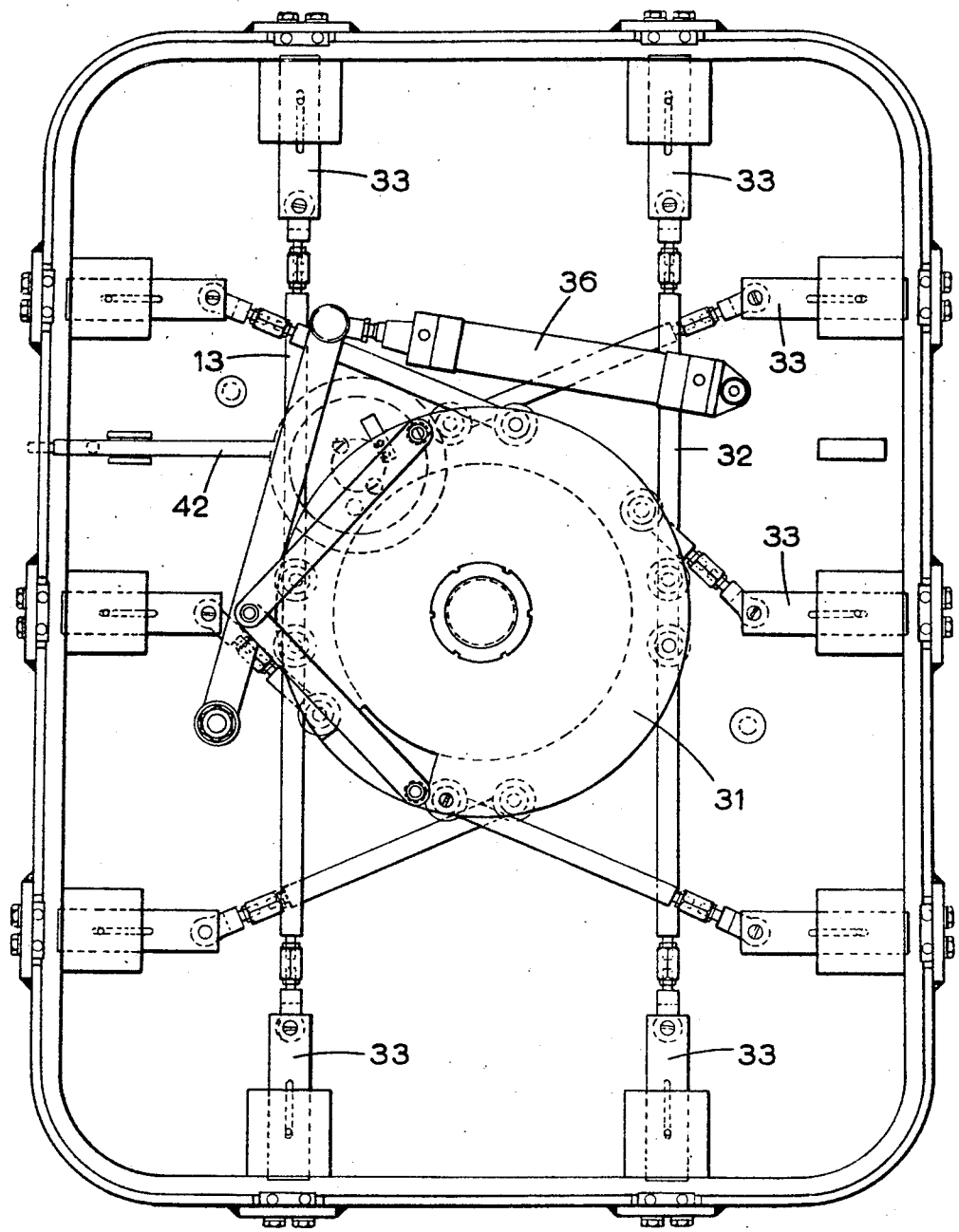

FIGURE 4 is a view showing a fluid pressure means for opening and closing the door of the sterilizer, FIGURES 5 and 6 are circuit diagrams illustrating various valves and switches controlling the operation of the sterilizer when the door is in the fully open position, FIGURE 7 is a front view of a modified door, FIGURE 8 is a sectional view of the modified door and a hydraulic cylinder removed, and FIGURE 9 is a hydraulic circuit diagram.

In the illustrated embodiment of the invention, a hospital sterilizer 1 has a hinged door 2 which can be opened and closed by movement of a piston in a cylinder 3 (hereinafter called the first cylinder) under the action of hydraulic power. For this purpose, a piston rod 4 of the piston is fixed to a suitable point on the door 2 and the cylinder 3 is fixed to a bracket 5 secured to a suitable point on the wall of the sterilizer 1 or vice versa.

Figure 3:
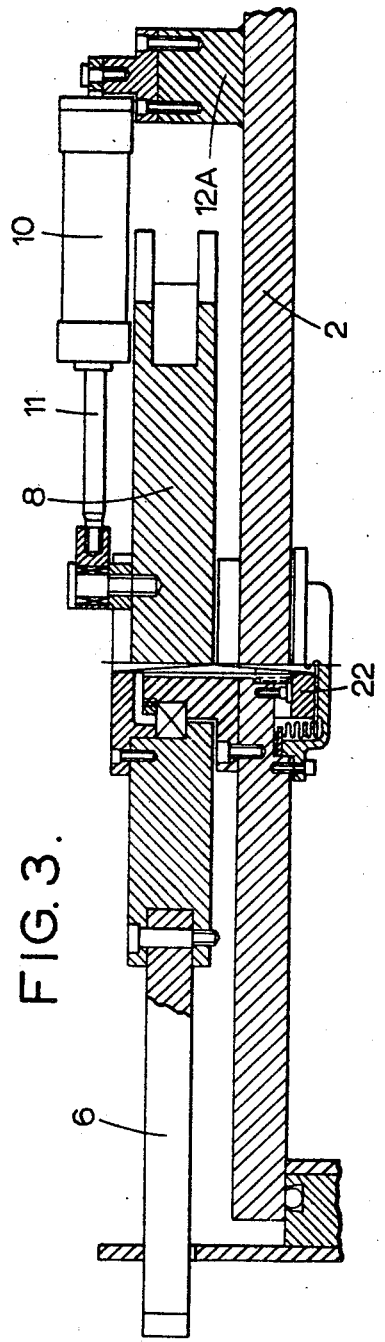
FIGURE 3 is another sectional view of the door.

The door 2 is provided with a locking device comprising a plurality of movable locking arms 6 mounted in guides 7 and a circular locking disc 8 is mounted for rotation on the door. The inner ends of the locking arms 6 are connected to this disc 8 in such a manner that when the disc is rotated in one direction the locking arms are moved to a position in which the outer ends of the locking arms 6 project beyond the periphery of the door into engagement with co-operating locking slots or apertures in a head ring 9 secured to the sterilizer 1 around the door 2 thereby to lock the door and that when the device is rotated in the opposite direction the locking arms are withdrawn from the slots or apertures thereby to unlock the door. The locking disc 8 is rotated by movement of the second piston in a second cylinder 10 under the action of hydraulic power, a rod 11 of the piston or the cylinder being connected to the disc 8 and the cylinder or the piston rod being connected to the door itself through a block 12A (FIGURE 3).

Hydraulic power is supplied to the cylinders 3 and 10 by an electrically driven pump 12 controlled by a switch 13. The circuit to this motor 12 includes an isolator switch 13A, a switch 13B and a micro-switch 13C as well as relays R1, R2 and R3. When the door 2 is open and it is desired to commence a sterilizing operation, the isolating switch 13A and the switch 13 are closed. The relay R1 is energized and relays R1 and R2 closed. When the door starts to close, the micro-switch 13C will change over. When the door is fully closed, another micro-switch 13D will energize the solenoid 17 (through the relay R2 and the switch 13). The locking bolts are fully engaged, the door switch 13 will change over thereby to provide power to a controller C and de-energize relay R1 so that relays R2 and R3 will open. Thus, the solenoid 17 will be de-energized and the pump 12 will be switched off. A predetermined sterilization cycle is then set in operation and the electrical circuit remains broken and the door remains locked during the whole of this cycle.

The sterilization cycle is controlled by the controller C. The hydraulic circuit is illustrated in FIGURE 5 and includes valves 14A and 17A controlled by the solenoids 14 and 17 to operate the rams 3 and 10. The pump 12 circulates oil from a reservoir R via inlet and exhaust manifolds 19 and 20. The hydraulic circuit includes a relief valve 21, throttle valve 22, and by-pass valve 23.

To open the door, the switch 13 is opened. The locking bolts will be caused to withdraw and when they have reached their limit of travel a micro-switch 13E will operate to energize the solenoids 14. The door will start to open so that micro-switch 13D will operate. When the door is fully opened, a micro-switch 13F operates to de-energize relay R1 and open relays R2 and R3. The solenoid 14 is de-energized and the pump 12 is switched off.

The door 2 is provided with a safety locking device 2 responsive to pressure inside the sterilizer so as to prevent the door being opened when the inside of the sterilizer is under pressure.

In the modification illustrated in FIGURES 7, 8 and 9, the door has inner and outer locking discs 30, 31 which are rotatable (either hydraulically or manually) in opposite directions about a common axis. These discs are associated with links 32 and locking bolts 33 which are engageable in apertures 34 of the door framework 35.

The arrangement is operated hydraulically by the circuit shown in FIGURE 9. This circuit includes a ram cylinder 36 for operating the discs, a ram cylinder 37 for opening and closing the door, an electrically driven pump 38 for circulating oil from a reservoir R, a control valve 39, throttle valve 40 and a relief valve 41.

The control valve 39 supplies oil to both ram cylinders simultaneously. The supply of oil to cylinder 37 closes the door in the same manner as the first embodiment. Although oil is being supplied to the outer cylinder 36, the ram will not be able to operate because of a trip lever 42 (FIGURE 7). When this lever is tripped, the two discs are free to rotate under the action of pressure in the cylinder 37 in opposite directions thereby to lock the door. A micro-switch (not illustrated) is arranged to switch off the pump 38 when the door is fully closed. It will be seen that this modification does not include any solenoids and, if desired, the discs may be rotated manually.

The control valve 39 can supply oil to opposite ends of the cylinders 36 and 37. When it is desired to open the door, the cylinder 36 operates to rotate the disc in a direction to remove the locking bolts 33 from the apertures 34. When the bolts are withdrawn, the cylinder 37 is free to open the door. When the door is fully open it catches a micro-switch which shuts off the pump.

If desired pneumatic power may be used instead of hydraulic power.

What is claimed is:

1. A pressure vessel provided with a plurality of locking slots surrounding an opening and comprising a hinged door adapted to close said opening; a locking disc rotatably mounted on said door; a plurality of locking arms slidably mounted on said door, said locking arms having inner ends connected with said disc and outer ends adapted to project beyond the periphery of said door into engagement with said locking slots; first piston and cylinder means operably by fluid pressure to open or close said door second piston and cylinder means operably by fluid pressure to rotate said disc for the purpose of moving said outer ends of said locking arms into or out of engagement with said locking slots; a control valve controlling the supply of fluid to both said piston and cylinder means; means for operating said control valve to supply fluid to said first piston and cylinder means to open said door when said locking arms are disengaged from said locking slots; and means for operating said control valve to supply fluid to said second piston and cylinder means to rotate said disc in a direction to engage said locking arms in said locking slots when said door has been closed by said first piston and cylinder means.

2. A pressure vessel having an opening providing access to the interior thereof and a plurality of locking slots surrounding said opening; a hinged door adapted to close said opening; a plurality of locking arms mounted on said door so as to be movable into and out of engagement with said locking slots; a locking disc mounted on said door, said disc being operatively connected with said locking arms and rotatable to move said arms into or out of engagement with said slots; first means operable by fluid pressure to open or close said door; second means operably by fluid pressure to rotate said disc; an electric circuit; an electrically driven pump in said circuit operable to supply fluid under pressure to said first and said second means; a first solenoid in said circuit operable to set said pump in operation; a first switch in said circuit operable to energize said solenoid; a control valve operable by said first solenoid to direct fluid under pressure to said first means to operate said first means for closing said door; a second solenoid in said circuit operable to adjust said control valve to direct fluid under pressure to said second means for the pupose of engaging said locking arms with said slots; a second switch in said circuit automatically operable when said door is closed to operate said second solenoid to direct fluid to said second means; a third switch for breaking said circuit and slot off said pump when said locking arms are engaged in said slots; and a fourth switch in said circuit and operable when desired to set said pump to disengage said locking arms from said slots and to open said door.

3. A pressure vessel having an opening providing access to the interior thereof and a plurality of locking apertures surrounding said opening; a hinged door adapted to close said opening; a pair of locking discs rotatably mounted on said door, one of said discs being arranged between the outer of said discs and said door; a plurality of locking bolts slidably mounted on said door so as to be movable into said out of engagement with said locking apertures, some of said bolts being operatively connected with one of said discs and the remainder of said bolts being operatively connected with the outer of said discs whereby rotation of said discs will slide said bolts into or out of engagement with said locking apertures; and means operable by fluid pressure to open and close said door.

4. A pressure vessel having an opening therein to provide access to the interior thereof and a plurality of locking apertures surrounding said opening; a hinged door adapted to close said opening; first means operated by fluid pressure to open or close said door; inner and outer locking discs mounted on said door for rotation about a common axis; a plurality of locking bolts slidably mounted on said door, movably into or out of engagement with said locking apertures; a plurality of links operatively surrounding some of said bolts with said inner disc being rotatable said bolts to slide into or out of engagement with said locking apertures second means operable by fluid pressure to rotate said discs in opposite directions; and a pump for supplying fluid under pressure to said first and second means.

5. A pressure vessel as claim in claim 4 comprising in addition trip means for preventing rotation of said discs until said door is closed.

6. A pressure vessel having an opening therein to provide access to the interior thereof and a plurality of locking apertures surrounding said opening; a hinged door adapted to close said opening; manually operated means for opening and closing the door; inner and outer locking discs mounted on said door for rotation about a common axis; a plurality of locking bolts slidably mounted on said door, movable into or out of engagement with said locking apertures; a plurality of links operatively surrounding some of said bolts with said inner disc, said bolts being rotatable to slide into or out of engagement with said locking apertures and manually operated means for rotating the discs in opposite directions.

References Cited

UNITED STATES PATENTS

| 2,033,305 | 3/1936 | Roy | 292—7 |
| 2,134,147 | 10/1938 | Rea | 292—7 X |
| 2,375,196 | 5/1945 | Cederwall | 292—7 X |
| 2,875,918 | 3/1959 | Baumier | 292—7 X |
| 3,195,761 | 7/1965 | Coats | 49—280 X |

DAVID J. WILLIAMOWSKY, *Primary Examiner.*

J. K. BELL, *Assistant Examiner.*